United States Patent [19]

Zayets et al.

[11] Patent Number: 5,939,144
[45] Date of Patent: Aug. 17, 1999

[54] METHOD AND COMPOSITION FOR DIFFUSION TREATMENT OF CERAMIC MATERIALS

[75] Inventors: Inna I. Zayets; Lidia O. Chunayeva; Grigory A. Tkach, all of Kharkiv, Ukraine

[73] Assignee: Jamar Venture Corporation

[21] Appl. No.: 08/956,805

[22] Filed: Oct. 23, 1997

Related U.S. Application Data

[60] Provisional application No. 60/029,059, Oct. 25, 1996.
[51] Int. Cl.$^6$ ........................................................ B05D 3/02
[52] U.S. Cl. ................................. 427/376.3; 427/397.7; 427/383.5; 427/374.1; 427/190; 427/252; 427/253; 427/249
[58] Field of Search ............................. 427/376.2, 376.3, 427/397.7, 383.5, 374.1, 190, 252, 253, 248.1, 249, 226

[56] References Cited

U.S. PATENT DOCUMENTS

| | | | |
|---|---|---|---|
| 4,276,088 | 6/1981 | Zaets et al. | 106/1.12 |
| 4,664,942 | 5/1987 | Park | 427/57 |
| 4,963,395 | 10/1990 | Lewis et al. | 427/253 |

FOREIGN PATENT DOCUMENTS

| | | |
|---|---|---|
| 4238220 | 5/1993 | Germany . |
| 4244306 | 3/1994 | Germany . |
| 981794 | 1/1965 | United Kingdom . |
| 1002820 | 9/1965 | United Kingdom . |

*Primary Examiner*—Shrive Beck
*Assistant Examiner*—Michael Barr
*Attorney, Agent, or Firm*—Biebel & French

[57] ABSTRACT

The present invention provides a composition and method for use in diffusion coating ceramic workpieces. In an especially preferred form, the composition comprises:

Chromium 45–50 wt %
Silicon Carbide 3.5–5.0 wt %
Vanadium Boride 0.5–1.5 wt %
Ammonium Halide 5.0–6.0 wt %
Aluminum Oxide Remainder, the sum of all the components being 100 wt %. The components, in powdered form, are weighed and mixed in a container. The workpieces are placed in the container. The container is hermetically sealed and heated to a temperature of approximately 1000° C. The workpieces and the composition are kept at approximately 1000° C. for a predetermined period of time sufficient to permit a surface layer of desired thickness to form. The container is then cooled in a conventional cooling chamber down to approximately 300°–350° C. and air cooled to room temperature. The container is opened and the workpieces are removed. The composition and method of the present invention provide diffusion coatings on ceramic base materials which decrease the brittleness of the base material and improve the chemical resistance of the base material to aggressively corrosive environments.

10 Claims, No Drawings ns. As the chromium metal in the coating dissolves in these environments, however, the chemical resistance of the workpiece decreases.

There remains a need in the art for a diffusion coating method and composition for reducing the brittleness of ceramic base materials and for promoting chemical resistance to aggressive chemical environments.

METHOD AND COMPOSITION FOR DIFFUSION TREATMENT OF CERAMIC MATERIALS

PRIOR PROVISIONAL APPLICATION

Applicant claims the benefit of the filing date of Provisional Application Ser. No. 60/029,059, filed Oct. 25, 1996.

BACKGROUND OF THE INVENTION

1. Field of the Invention

The present invention relates to a composition and method for diffusion coating ceramic materials, and more particularly to a method for diffusion coating ceramic materials using a pulverous coating composition including chromium.

2. Description of Related Art

Ceramic materials are widely used in different branches of U.S. industry. Among their uses are as fire resistant materials in the steel industry and as abrasives in the automotive industry. Tool ceramics are used in the production of glass. Ceramics are also used in construction, electronics and the nuclear energy industry.

Even metals such as titanium and alloy steels tend to have low resistances to certain aggressively corrosive environments such as concentrated chloridic or salt solutions. For example, the working wheels of pumps formed from metals such as titanium often dissolve within a month when exposed to a concentrated sodium hydroxide solution. Ceramic materials tend to be cheaper than metals and are characterized by good chemical resistance in various environments. As a result, ceramic materials are useful for forming protective coatings for chemical storage containers and in the engineering of chemical equipment. Despite these advantages, the brittleness of conventional ceramic materials limits their use in the chemical industry.

Conventional techniques for protecting the surfaces of ceramic workpieces include metallization, flame-spraying, plasma and plasma-layer spraying. Ceramic workpieces treated by these methods remain brittle because these methods affect only the strength and chemical properties of the surfaces of the workpieces and do not affect their internal structures.

Diffusion coating is carried out by heating a workpiece in the presence of a powdered coating composition. The process has the advantages of uniform heating as the process takes place in a powder mixture with low heat conductivity and of deep or complete penetration of components of the powdered composition into the internal structure of the base material. The process strengthens not only the surface of the workpiece but also its structure. As a result, the workpiece obtains a number of physical and chemical properties which decrease its brittleness and improve its resistance to aggressive chemical environments.

Various compositions have been proposed for use in diffusion coating. One proposed composition for use in diffusion coating metal workpieces has the following components:

Chromium 50 wt %
Aluminum Oxide 43–45 wt %
Ammonium Chloride 5–7 wt %.

This composition provides some surface protection due to the formation of a solid solution of chromium in iron on the surface. The resulting coating has good chemical resistance in corrosive environments of low and medium aggressive-

SUMMARY OF THE INVENTION

The present invention provides a composition and method for use in diffusion-coating ceramic workpieces. A preferred form of the composition includes chromium in combination with microadditions such as silicon carbide and vanadium boride. In an especially preferred form, the composition comprises:

Chromium 45–50 wt %
Silicon Carbide 3.5–5.0 wt %
Vanadium Boride 0.5–1.5 wt %
Ammonium Halide 5.0–6.0 wt %
Aluminum Oxide Remainder, the sum of all the components being 100 wt %. The preferred ammonium halide is ammonium chloride.

The invention also provides a relatively simple coating method which can be performed using conventional equipment. The components, in powdered form, are weighed and mixed in a container. The workpieces are placed in the container. The container is hermetically sealed and heated to a temperature of approximately 1000° C. No protective atmosphere is required.

The workpieces and the composition are kept at approximately 1000° C. for a predetermined period of time sufficient to permit a surface layer of desired thickness to form. The container is then cooled in a conventional cooling chamber down to approximately 300°–350° C. and air cooled to room temperature. The container is then opened and the workpieces are removed.

The introduction of the microadditions to the chromium-based coating composition increases the chemical and abrasion resistance of the resulting surface layer. Without wishing to be bound by any theory of operation, it is believed that the silicon carbide microaddition contributes to the formation of metal carbides in the surface layer. These carbides have low diffusion mobility at high temperatures and promote both chemical resistance and decreased brittleness.

The process is believed to form a continuous, unbroken outer phase of silicon carbide and vanadium boride surrounding a eutectoid chromium solid solution. This morphology provides a specifically dense structure for the protective surface layer. If insufficient amounts of silicon carbide and vanadium boride are used, a continuous, unbroken surface phase will not form and the chromium solid solution will be subject to chemical attack in corrosive environments.

Complete penetration of the components of the coating mixture into the base material has been observed in workpieces of 5 mm width. This deep or complete penetration of the composition into the workpiece tends to decrease the brittleness of the ceramic.

The high corrosion resistance of ceramic parts coated according to the present invention is especially desirable for uses in the chemical industry. Ceramic parts treated according to the present invention are likely to be lower in price and to survive aggressively corrosive environments significantly longer than pure metals. For example, parts diffusion-coated in accordance with the present invention may survive exposure to a solution of soda ash manufacturing without becoming brittle for approximately 6–7 times as long, or longer, than might a comparable titanium part.

Preferred ceramic base materials for use in the process of the present invention include aluminum oxide ceramics. The process of the present invention is capable of forming protective layers on aluminum oxide ceramics even if the residual porosities of the ceramics are very low. Pump parts made from cast aluminum oxide ceramic treated according to the present invention have operated for over a year in concentrated solutions of soda ash manufacturing, whereas the working wheels of pumps formed of metals such as stainless steel often dissolve in such an environment within a month.

Therefore, it is one object of the invention to provide a diffusion coating composition and method effective to reduce the brittleness of ceramic base materials and to promote chemical resistance to aggressively corrosive environments. The invention will be further described in conjunction with the following detailed description.

DETAILED DESCRIPTION OF THE PREFERRED EMBODIMENT

The invention will be further explained in conjunction with the following examples which are included as being illustrative of the invention and should not be construed to limit the scope of the invention.

EXAMPLE 1

A mixture of the following components was weighed out and placed in a sealed container with a 200 mm×35 mm×5 mm nozzle made from aluminum oxide ceramic and three 30 mm×30 mm×5 mm ceramic test samples:

Chromium 47.0 wt %

Silicon Carbide 5.0 wt %

Vanadium Boride 1.2 wt %

Ammonium Halide 5.0 wt %

Aluminum Oxide Remainder, the sum of all the components being 100 wt %. The container was heated up to 980° C. for two hours, cooled to 300° C. in the furnace and further cooled in the air.

The test samples with the newly-formed protective surface layers were tested by means of (1) X-ray structural analysis and (2) exposure to a corrosive solution of ammonium chloride, sodium sulfate and sodium bicarbonate. The X-ray structural analysis of the diffused carbide layer showed that the process resulted in the formation of a continuous, unbroken surface phase containing silicon carbide and vanadium boride overlaying a chromium solid solution. The subsurface layer contained inclusions of metallic chromium. The thickness of the diffused carbide layer was 10–11 $\mu$m.

The treated ceramic workpieces and untreated aluminum oxide ceramic nozzles were exposed at 85° C. to a corrosive solution having the following constituents:

Ammonium Chloride 17%

Sodium Sulfate 8%

Sodium Bicarbonate 5%

The treated ceramic workpieces retained good chemical and mechanical resistance after one year, whereas the untreated nozzles became brittle after only two months of exposure to the solution.

EXAMPLE 2

A mixture of the following components was weighed out and placed in a sealed container with 40 mm×50 mm ceramic washers:

Chromium 50.0 wt %

Silicon Carbide 4.0 wt %

Vanadium Boride 1.5 wt %

Ammonium Halide 5.0 wt %

Aluminum Oxide Remainder, the sum of all the components being 100 wt %. The container was heated up to 960° C. for two to five hours, cooled to 300° C. in the furnace and further cooled in the air.

An X-ray structural analysis of the diffused carbide layer showed that the process resulted in the formation of a continuous, unbroken surface phase containing silicon carbide and vanadium boride overlaying a chromium solid solution. The subsurface layer contained inclusions of metallic chromium. The thickness of the diffused carbide layer was 12 $\mu$m.

The treated ceramic workpieces and untreated ceramic washers were tested on a special bench that simulated the friction between two solid bodies in a solution containing 20 g/L dissolved sulfur dioxide and 100 g/L sodium chloride. The treated ceramic workpieces retained good chemical and mechanical resistance after 6,000 work cycles on the test bench, whereas the untreated washers became brittle after only 3,000 work cycles.

EXAMPLE 3

Additional ceramic workpieces were treated according to the method of the present invention using various pulverous compositions. The treated workpieces were tested to determine their Vickers hardnesses and their brittlenesses after exposure to various corrosive environments. The results are shown in Table 1 below:

TABLE 1

| | Mass Percent of Components | | | | | Components and Temperature of Test Media | Microhardness | Test | Time | |
|---|---|---|---|---|---|---|---|---|---|---|
| | Cr | SiC | VB | $NH_4Cl$ | $Al_2O_3$ | g/l | HV kg/mm$^2$ | Samples | hours | Brittleness |
| 3 | 50 | 5.0 | 1.0 | 5 | Rest | $NH_4Cl$ - 170; $Na_2SO_3$ - 80; $NaHCO_3$ - 5.; Temp. - 85° C. | 1800 | Pump Part | 1200 | NO |
| 4 | 50 | 4.5 | 0.8 | 5 | " | $NH_4Cl$ - 170; $Na_2SO_3$ - 80; $NaHCO_3$ - 5.; Temp. - 85° C. | 1700 | " | 1200 | NO |
| 5 | 50 | 3.9 | 1.5 | 5 | " | $NH_4Cl$ - 170; $Na_2SO_3$ - 80; $NaHCO_3$ - 5.; Temp. - 85° C. | 1700 | " | 1200 | NO |
| 6 | 45 | 32 | 0.4 | 5 | " | $NH_4Cl$ - 170; $Na_2SO_3$ - 80; $NaHCO_3$ - 5.; Temp. - 85° C. | 1200 | " | 1000 | YES |
| 7 | 50 | 4.9 | 0.9 | 5 | " | $NH_4Cl$ - 170; $Na_2SO_3$ - 80; $NaHCO_3$ - 5.; Temp. - 85° C. | 1750 | " | 1200 | NO |

TABLE 1-continued

| | Mass Percent of Components | | | | | Components and Temperature of Test Media | Microhardness | Test | Time | |
|---|---|---|---|---|---|---|---|---|---|---|
| | Cr | SiC | VB | NH$_4$Cl | Al$_2$O$_3$ | g/l | HV kg/mm$^2$ | Samples | hours | Brittleness |
| 8 | 50 | 4.7 | 1.1 | 5 | " | NH$_4$Cl - 170; Na$_2$SO$_3$ - 80; NaHCO$_3$ - 5.; Temp. - 85° C. | 1650 | " | 1200 | NO |
| 9 | 45 | 5.0 | 1.4 | 6 | " | SiO$_2$ - 20; N$_2$CO$_3$ - 100; Temp. - 25° C. | 1700 | Washer | 6000 | NO |
| 10 | 45 | 3.5 | 0.6 | 6 | " | SiO$_2$ - 20; N$_2$CO$_3$ - 100; Temp. - 25° C. | 1500 | " | 6000 | NO |
| 11 | 50 | 4.0 | 1.3 | 6 | " | SiO$_2$ - 20; N$_2$CO$_3$ - 100; Temp. - 25° C. | 1750 | " | 6000 | NO |
| 12 | 45 | 3.4 | 0.4 | 6 | " | SiO$_2$ - 20; N$_2$CO$_3$ - 100; Temp. - 25° C. | 1350 | " | 3500 | YES |
| 13 | 45 | 4.0 | 0.7 | 6 | " | HNO$_3$ - 65%, Temp. - 56° | 1600 | Pump Part | 1200 | NO |
| 14 | 45 | 3.7 | 1.3 | 5 | " | HNO$_3$ - 65%, Temp. - 56° | 1650 | " | 1200 | NO |
| 15 | 45 | 4.8 | 0.9 | 6 | " | HNO$_3$ - 65%, Temp. - 56° | 1700 | " | 1200 | NO |
| 16 | 50 | 5.5 | 1.6 | 5 | " | HNO$_3$ - 65%, Temp. - 56° | 1900 | " | 1100 | NO |
| 17 | 50 | 3.8 | 1.2 | 5 | " | HNO$_3$ - 65%, Temp. - 56° | 1600 | " | 1200 | NO |

These results confirmed that the composition and method of the present invention provide diffusion coatings having desirable chemical resistance and plasticity properties. Those test samples treated with coating compositions within the preferred ranges of the invention had Vickers hardnesses within the desirable range of 1,500–1,800 kg/mm$^2$ and survived thousands of hours' exposure to corrosive solutions without becoming brittle. Increased percentages of chromium, silicon carbide and vanadium boride each tended to result in treated workpieces having increased Vickers hardnesses.

These results also confirmed the preferred ranges for the silicon carbide and vanadium boride components. Those samples treated with coating compositions having less than 3.5 wt % silicon carbide and less than 0.5 wt % vanadium boride each showed both relatively low hardness and low chemical resistance. This can be seen by comparing the results of Tests Nos. 10 and 12. In Test No. 12, a ceramic washer treated with a coating composition having 45 wt % chromium, only 3.4 wt % silicon carbide and only 0.4 wt % vanadium boride had a Vickers hardness of only 1350 kg/mm$^2$ and became brittle after 3,500 hours exposure to a solution of sulfur oxide and sodium carbonate. By way of comparison, in Test No. 10, a ceramic washer treated with a coating composition having 45 wt % chromium, 3.5 wt % silicon carbide and 0.6 wt % vanadium boride had a Vickers hardness of 1500 kg/mm$^2$ and resisted brittleness even after 6,000 hours exposure to the solution of sulfur oxide and sodium carbonate.

At the other end of the range, the one sample treated with a coating composition having in excess of 5.0 wt % silicon carbide and 1.5 wt % vanadium boride showed signs of inherent brittleness. In Test No. 16, a ceramic pump part treated with a coating composition having 50 wt % chromium, 5.5 wt % silicon carbide and 1.6 wt % vanadium boride had a Vickers hardness of 1900 kg/mm$^2$ and was brittle after 1,100 hours exposure to a 65% nitric acid solution. By way of comparison, in Test No. 15, a ceramic pump part treated with a coating composition having 50 wt % chromium, 4.8 wt % silicon carbide and 0.9 wt % vanadium boride had a Vickers hardness of 1700 kg/mm$^2$ and resisted brittleness even after 1,200 hours exposure to the 65% nitric acid solution.

The preceding description is intended to be illustrative of the invention and not limiting. Various other modifications and applications will be apparent to one skilled in the art without departing from the true spirit and scope of the invention as defined in the following claims.

We claim:

1. A method for forming a diffusion coating on a ceramic workpiece comprising the steps of:
    a) forming a powdered mixture including chromium, silicon carbide, vanadium boride, ammonium halide, and aluminum oxide;
    b) exposing the ceramic workpiece to the mixture; and
    c) heating the ceramic workpiece and the mixture, so as to form said diffusion coating.

2. The method as recited in claim 1 wherein the step c) includes heating the workpiece and the mixture to a temperature of approximately 1000° C.

3. The method as recited in claim 1 wherein the step c) includes heating the workpiece and the mixture to a temperature of approximately 1000° C. in a furnace; and wherein the method includes the additional step of cooling the workpiece in the furnace to a temperature of approximately 300°–350° C.

4. The method as recited in claim 3 including the additional step of cooling the workpiece in air from approximately 300°–350° C. to room temperature.

5. The method as recited in claim 1 wherein the step a) includes forming the powdered mixture from components including approximately 45–50 wt % chromium, approximately 3.5–5.0 wt % silicon carbide, approximately 0.5–1.5 wt % vanadium boride, approximately 5–6 wt % ammonium halide, and aluminum oxide, the sum of all the components being 100 wt %.

6. The method as recited in claim 5 wherein the step c) includes heating the workpiece and the mixture to a temperature of approximately 1000° C.

7. The method as recited in claim 5 wherein the step c) includes heating the workpiece and the mixture to a temperature of approximately 1000° C. in a furnace; and wherein the method includes the additional step of cooling the workpiece in the furnace to a temperature of approximately 300°–350° C.

8. The method as recited in claim 7 including the additional step of cooling the workpiece in air from approximately 300°–350° C. to room temperature.

9. A method for forming a diffusion coating on a ceramic workpiece comprising the steps of:
    a) forming a mixture from components including approximately 45–50 wt % chromium, approximately 3.5–5.0 wt % silicon carbide, approximately 0.5–1.5 wt % vanadium boride, approximately 5–6 wt % ammonium chloride, and aluminum oxide, the sum of all the components being 100 wt %;

b) sealing the ceramic workpiece and the mixture in a container; and c) heating the ceramic workpiece and the mixture in the container to a temperature of approximately 1000° C. to induce diffusion of at least part of the components into the ceramic workpiece.

10. The method as recited in claim 9 wherein the step c) includes heating the workpiece and the mixture to 1000° C. in a furnace; and wherein the method includes the additional steps of cooling the workpiece to approximately 300°–350° C. in the furnace, air cooling the workpiece from 300°–350° C. to room temperature, and removing the workpiece from the container.

* * * * *